(12) United States Patent
Teshima et al.

(10) Patent No.: US 9,010,296 B2
(45) Date of Patent: Apr. 21, 2015

(54) PISTON FOR SPARK-IGNITION ENGINE

(75) Inventors: Kazuyuki Teshima, Higashihiroshima (JP); Yoshikazu Nishiyama, Higashihiroshima (JP); Hiroyuki Takeshige, Higashihiroshima (JP); Hiroaki Muranaka, Higashihiroshima (JP)

(73) Assignees: Kolbenschmidt K. K., Hiroshima (JP); Mazda Motor Corporation, Hiroshima (JP)

( * ) Notice: Subject to any disclaimer, the term of this patent is extended or adjusted under 35 U.S.C. 154(b) by 11 days.

(21) Appl. No.: 13/806,972

(22) PCT Filed: Jun. 10, 2011

(86) PCT No.: PCT/JP2011/003294
§ 371 (c)(1),
(2), (4) Date: Dec. 26, 2012

(87) PCT Pub. No.: WO2012/001887
PCT Pub. Date: Jan. 5, 2012

(65) Prior Publication Data
US 2013/0092116 A1 Apr. 18, 2013

(30) Foreign Application Priority Data

Jun. 29, 2010 (JP) ................................ 2010-147117

(51) Int. Cl.
*F02F 3/00* (2006.01)
*F02B 23/10* (2006.01)
(Continued)

(52) U.S. Cl.
CPC ............. *F02F 3/0015* (2013.01); *F02B 23/104* (2013.01); *F02B 2075/125* (2013.01); *F02F 3/04* (2013.01); *F16J 1/001* (2013.01); *Y02T 10/125* (2013.01); *Y02T 10/123* (2013.01)

(58) Field of Classification Search
CPC ............... F02F 3/00; F02F 3/10; F02F 3/022; F02F 3/08; F02F 3/28; F02F 3/027
USPC ........... 123/193.1, 193.4, 193.6; 92/237, 160, 92/235, 158, 159; 29/888.04
See application file for complete search history.

(56) References Cited

U.S. PATENT DOCUMENTS 5,738,057 A * 4/1998 Vallejos ...................... 123/193.5
6,360,709 B1 * 3/2002 Soltis et al. ................. 123/193.6

(Continued)

FOREIGN PATENT DOCUMENTS

| JP | 2005-337027 A | 12/2005 |
|---|---|---|
| JP | 2007-278251 A | 10/2007 |

(Continued)

OTHER PUBLICATIONS

International Search Report; PCT/JP2011/003294; Sep. 13, 2011.
(Continued)

*Primary Examiner* — Noah Kamen
*Assistant Examiner* — Long T Tran
(74) *Attorney, Agent, or Firm* — Studebaker & Brackett PC (57) ABSTRACT

The present invention provides a piston for a spark-ignition engine, comprising: a land part 18, an upper surface part of which has a crown part 26 forming a combustion chamber; a pair of skirt parts 20 extending downward from a peripheral part of the land part 18 and facing each other in a radial direction thereof; a pair of sidewall parts 19 coupling side end parts of the pair of skirt parts 20 to each other; and a pin boss part 21 that is formed in each of the sidewall parts 19. The present invention can inhibit the generation of HC produced at the time of combustion, while thermally protecting a top ring 30 fitted into a top ring groove 24a on an outer circumferential surface of the land part 18. The crown part 26 is configured by a flat base surface 27 and a bulging part 15 bulging upward above the base surface 27, and a thinned part 40 provided in the land part 18 is formed deep such that the deepest part thereof is positioned inside the bulging part 15.

4 Claims, 6 Drawing Sheets (51) Int. Cl.
*F02F 3/04* (2006.01)
*F16J 1/00* (2006.01)
*F02B 75/12* (2006.01)

(56) References Cited

U.S. PATENT DOCUMENTS

| | | | |
|---|---|---|---|
| 6,609,485 B2 * | 8/2003 | Murglin | 123/41.35 |
| 6,609,890 B2 * | 8/2003 | Budris et al. | 416/1 |
| 6,990,890 B2 * | 1/2006 | Zhu et al. | 92/159 |
| 7,005,620 B2 * | 2/2006 | Ribeiro et al. | 219/635 |
| 7,086,368 B2 | 8/2006 | Endoh et al. | |
| 7,127,981 B2 * | 10/2006 | Endoh et al. | 92/165 PR |
| 7,325,525 B2 * | 2/2008 | Saito et al. | 123/193.6 |
| 2005/0092280 A1 | 5/2005 | Endoh et al. | |
| 2008/0245229 A1 * | 10/2008 | Buschbeck et al. | 92/186 |
| 2009/0301426 A1 * | 12/2009 | Ko | 123/193.6 |
| 2010/0089358 A1 * | 4/2010 | Golya | 123/193.4 |
| 2010/0175660 A1 * | 7/2010 | Nishimoto et al. | 123/305 |

FOREIGN PATENT DOCUMENTS

| | | |
|---|---|---|
| JP | 2008-008170 A | 1/2008 |
| JP | 2009-507173 A | 2/2009 |
| JP | 2009-121324 A | 6/2009 |

OTHER PUBLICATIONS

An Office Action; "Notice of Reasons for Rejection," issued by the Japanese Patent Office on Mar. 25, 2014, which corresponds to Japanese Patent Application No. 2012-552201 and is related to U.S. Appl. No. 13/806,972; with English language summary.

* cited by examiner

BOSS SHAFT CENTER DIRECTION

EXHAUST SIDE ← INTAKE/EXHAUST DIRECTION → INTAKE SIDE

Fig. 10

EXHAUST SIDE ← INTAKE/EXHAUST DIRECTION → INTAKE SIDE

PISTON FOR SPARK-IGNITION ENGINE

TECHNICAL FIELD

The present invention relates to a technical field of a piston for a spark-ignition engine that has a land part, an upper surface part of which has a crown part forming a combustion chamber, a pair of skirt parts extending downward from a peripheral part of the land part and facing each other in a radial direction thereof, a pair of sidewall parts coupling side end parts of the pair of skirt parts to each other, and a pin boss part formed in each of the sidewall parts.

BACKGROUND ART

As this type of piston, there is known, for example, a piston of Japanese Patent Application Publication No. 2008-008170 (referred to as "Patent Document" hereinafter) in which a crown part is configured by a flat base surface and a ring-shaped bulging part bulging above the base surface.

The weight of this piston is reduced by the formation of a recess on a lower surface of a land part of the piston, and disruption of the weight balance of the piston is prevented by providing this recess with two ribs of different weights. Two seal ring grooves and one oil ring groove are formed on an outer circumferential surface of the land part, successively from the top. Seal rings are fitted into the seal ring grooves in order to keep air-tightness of a combustion chamber. An oil ring is fitted into the oil ring groove in order to scrape oil off an inner circumferential surface of a cylinder.

By the way, in a state in which the piston is inserted and fitted into the cylinder, an extremely narrow annular concave space is formed between the top seal ring (referred to as "top ring" hereinafter), the inner circumferential surface of the cylinder, and the outer circumferential surface of the land part. Intake air-fuel mixture cannot combust easily in this concave space, leaving unburnt gas therein. Therefore, from the perspective of inhibiting the generation of HC (hydrocarbon), it is preferred that the size of the concave space be minimized. In order to do so, the base surface needs to be brought as close as possible to the position of the top ring; however, the closer the base surface is to the position of the top ring, the more difficult for the top ring to tolerate the heat of combustion. This is not preferable in terms of thermally protecting the top ring.

CITATION LIST

Patent Literature

[PTL 1]
Japanese Patent Application Publication No. 2008-008170

SUMMARY OF INVENTION

The present invention was contrived in view of the above circumstances, and an object thereof is to thermally protect a top ring and inhibit the generation of HC by creatively devising the structure of a piston for a spark-ignition engine.

In order to achieve the object described above, the present invention has a crown part configured by a flat base surface and a bulging part bulging upward above the base surface, wherein the bulging part is utilized to form a thinned part of a land part so that a deepest part of the thinned part is positioned deep inside the bulging part.

More specifically, the invention of the present application is a piston for a spark-ignition engine, having:

a land part, an upper surface of which has a crown part forming a combustion chamber;

a pair of skirt parts extending downward from a peripheral part of the land part and facing each other in a radial direction thereof;

a pair of sidewall parts coupling side end parts of the pair of skirt parts to each other; and a pin boss part that is formed in each of the sidewall parts, wherein the crown part has a flat base surface and a bulging part bulging upward above the base surface, a concave thinned part is opened in a region outside a predetermined region held between the sidewall parts in a lower surface of the land part, and an upper end part of the thinned part is located within the bulging part above the base surface of the crown part.

Based on the configuration described above, the piston for a spark-ignition engine according to the invention of the present application can thermally protect a top ring and inhibit the generation of HC by forming a thinned part of the land part so that the deepest part (the upper end part) thereof is positioned deep inside the bulging part.

DESCRIPTION OF EMBODIMENTS

Embodiments of the present invention are now described hereinafter in detail with reference to the diagrams.

Figure 1:
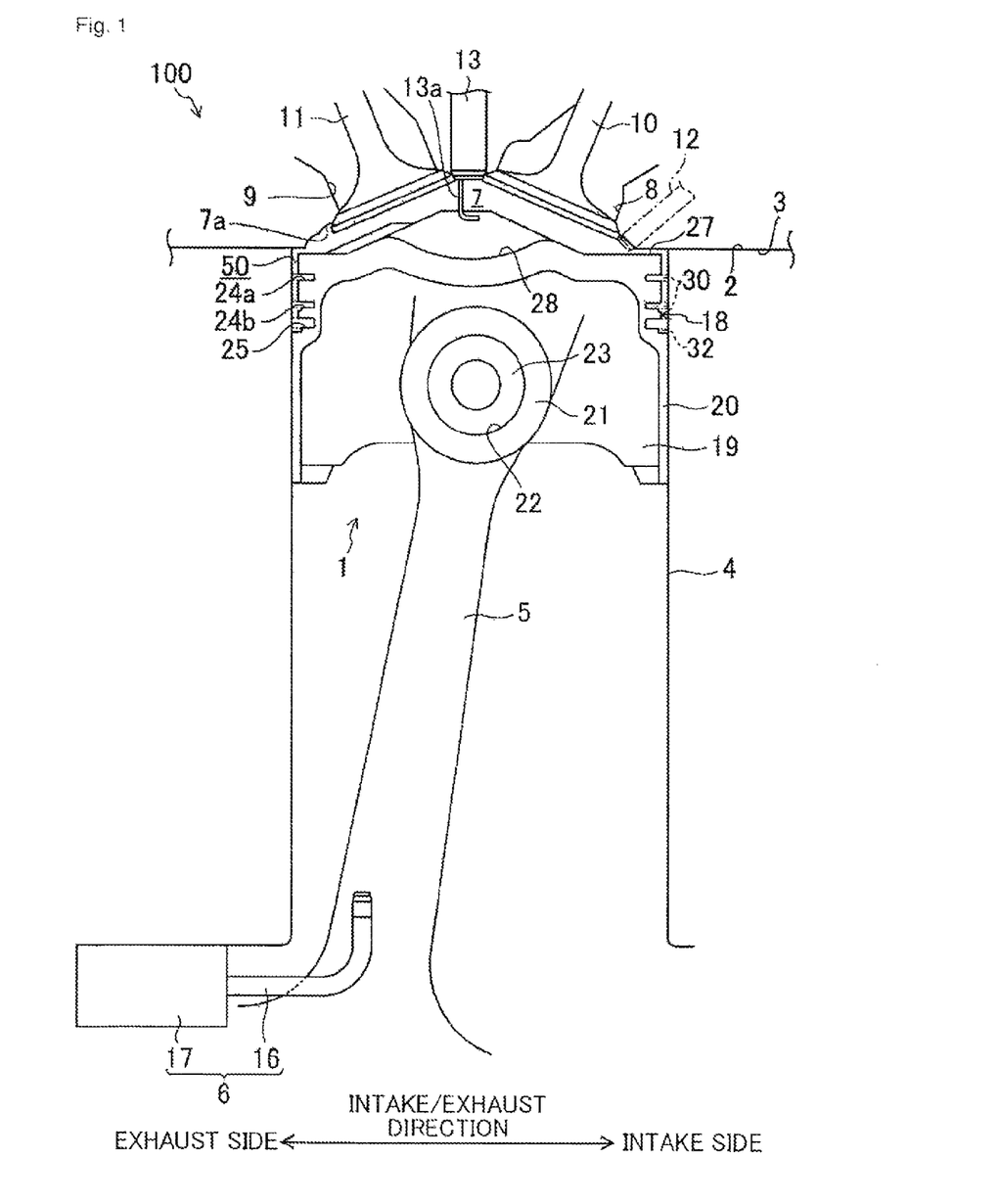
FIG. 1 is a cross-sectional diagram showing a peripheral configuration of a cylinder of an engine that has a piston according to an embodiment of the present invention.
Figure 2:
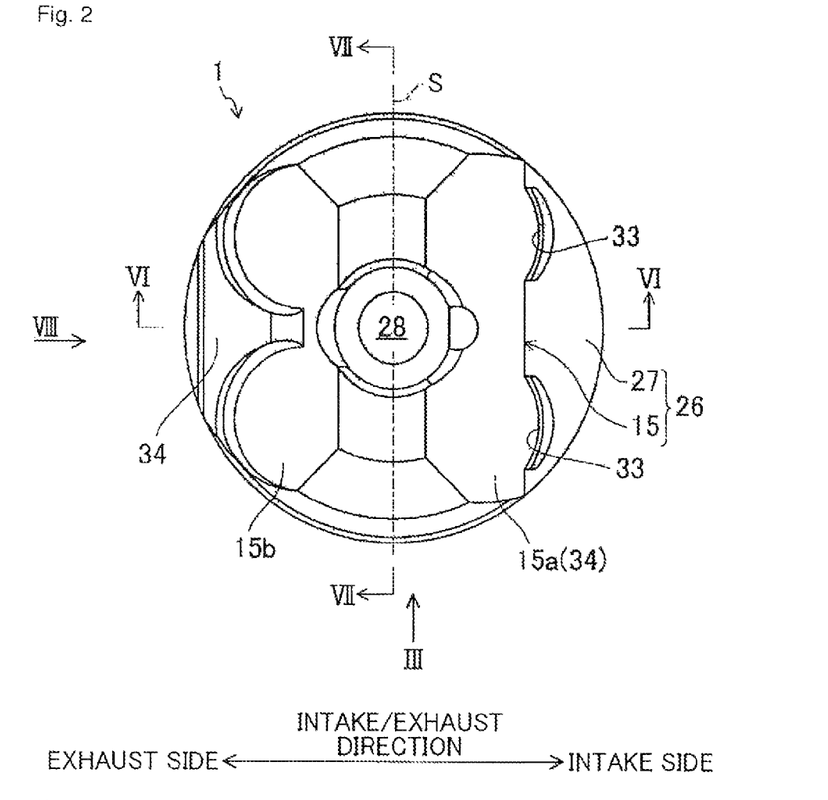
FIG. 2 a plan view in which the piston is viewed from above (from a crown part side)

FIG. 1 is a cross-sectional diagram showing a periphery of a cylinder of an engine 100 (a spark-ignition internal combustion engine) that has a piston 1 according to an embodiment of the present invention. This engine 100 has a cylinder block 2 and a cylinder head 3 attached to an upper part of the cylinder block 2. The piston 1 is stored in a cylinder 4 so as to be able to reciprocate vertically in the diagram, along a shaft center of the cylinder 4.

The piston 1 is coupled to a crankshaft by a connecting rod 5, the crankshaft being supported rotatably within a crank chamber provided in a lower part of the cylinder block 2. This converts the reciprocating motion of the piston 1 into a rotary motion of the crankshaft. The lower part of the cylinder block 2 is provided with an oil jet device 6 for cooling the piston 1.

As shown in the diagram, a combustion chamber 7 is formed above the piston 1 in the cylinder 4, and a ceiling part 7a of the combustion chamber 7 is configured by a recess that is formed for each cylinder 4 on a lower surface of the cylinder head 3.

In the present embodiment, the combustion chamber 7 is in the shape of a so-called pent roof, and the ceiling part 7a is in the shape of a triangle roof with two inclined surfaces for intake and exhaust sides. There are two intake ports 8 and two exhaust ports 9 opened on each of the inclined surfaces. The diameter of the intake ports 8 is greater than the diameter of the exhaust ports 9. For this reason, the position where the two inclined surfaces intersect with each other is slightly on the exhaust side with respect to the center of the cylinder.

As shown only in FIG. 1, an intake valve 10 is disposed in the opening part of each intake port 8, and an exhaust valve 11 is disposed in the opening part of each exhaust port 9. The intake valves 10 and the exhaust valves 11 are opened/closed at predetermined timing by a valve train, which is not shown.

In addition, an injector 12 (a fuel injection valve) is disposed under the intake ports 8, with a jetting port thereof aimed at a section between the opening parts of the intake ports 8, so as to inject fuel from a peripheral part of the combustion chamber 7 toward the center. This injector 12 is connected to a fuel-feeding system having a high-pressure fuel pump and the like, by a fuel distribution pipe, which is not shown. The present embodiment simulates a direct injection system, but the present invention can be applied to a port injection system as well.

Moreover, a spark plug 13 extending along a shaft center of the cylinder 4 is disposed in the cylinder head 3. An electrode 13a on a tip end (lower end) of the spark plug 13 is aimed at the combustion chamber 7 from the vicinity of the center of a ceiling part 7a. A spark coil unit, not shown, is connected to a base end of the spark plug 13, in order to produce a spark between electrodes at predetermined timing to ignite air-fuel mixture within the combustion chamber 7. It is preferred that the air-fuel mixture be ignited in the vicinity of the center of the combustion chamber 7 in order to achieve favorable flame propagation, as known in the prior art.

A bulging part 15, described hereinafter, is formed at a peak part of the piston 1 (a crown part 26), which is a floor part of the combustion chamber 7. This is effective in terms of adjusting the size of the combustion chamber 7 and setting a geometric compression ratio in the cylinder 4 high. In the present embodiment, this geometric compression ratio is set at 14, above 12. Needless to say, the value of the geometric compression ratio is not limited to 14.

The oil jet device 6 for cooling the piston 1 is connected to an oil pump (not shown) by an oil passage formed in the cylinder block 2. The oil jet device 6 is configured by an injection nozzle 16 and a main body part 17. The main body part 17 has a check valve embedded therein. The check valve is opened by the oil pressure within the oil passage when the engine speed reaches a predetermined engine speed or above, and injects oil from the injection nozzle 16.

In the injection nozzle 16, the direction of an injection port and the shape of the nozzle are set such that the oil is injected toward the exhaust side on the lower surface of the piston 1 (a land part 18). More specifically, the injection nozzle is configured to inject the oil toward an exhaust side end part in a predetermined region R held between the abovementioned pair of sidewall parts 19 on a lower surface 18a of the land part 18.

Configuration of the Piston

The piston 1 has the cylindrical land part 18, a pair of skirt parts 20, the pair of sidewall parts 19, and a pin boss part 21, as shown in FIGS. 1 to 8.

A substantially circular piston pinhole 22 is formed in a central part of the pin boss part 21. A piston pin 23 for coupling the piston 1 and the connecting rod 5 to each other is inserted into the piston pinhole 22. In a planar view, a shaft center S of the pin boss part 21 extends in a direction (cylinder array direction) perpendicular to an intake/exhaust direction through the center of the land part 18 (see FIG. 5).

Two seal ring grooves 24a, 24b and one oil ring groove 25 are formed on an outer circumferential surface of the land part 18, successively from the top. A seal ring 30 for improving the air-tightness of the combustion chamber 7 is fitted into each of the seal ring grooves 24a, 24b. An oil ring 32 for scraping the oil off an inner circumferential surface of the cylinder 4 is fitted into the oil ring groove 25. Note that, in the following descriptions, the top seal ring groove 24a is referred to as "top ring groove 24a," and the seal ring 30 fitted into this seal ring groove 24a is referred to as "top ring 30."

Each of the skirt parts 20 (see FIG. 6) is formed so as to extend downward from the land part. The skirt parts 20 are disposed to face each other in the intake/exhaust direction, with the pin boss part 21 therebetween. Each of the skirt parts 20 is formed into a substantially circular arc in a planar cross-sectional view (planar view), and slides on the inner circumferential surface of the cylinder 4 during the reciprocating motion of the piston 1. In the present embodiment, both of the skirt parts 20 have the same width L1 (see FIGS. 5 and 8).

The sidewall parts 19 (see FIG. 5) are formed so as to couple side end parts of the skirt parts 20 to each other and disposed to face each other in a direction of the shaft center S of the pin boss part (a direction perpendicular to the intake/exhaust direction). This forms a frame part 14 in which the sidewall parts 19 and the skirt parts 20 are disposed sequentially in a circumferential direction.

The crown part 26 that configures an upper surface part of the land part 18 is configured by a flat base surface 27 located in a peripheral part on an upper surface 18b of the land part 18, and the bulging part 15 that bulges above the base surface 27 (see FIGS. 1 to 3 and FIG. 6).

Figure 3:
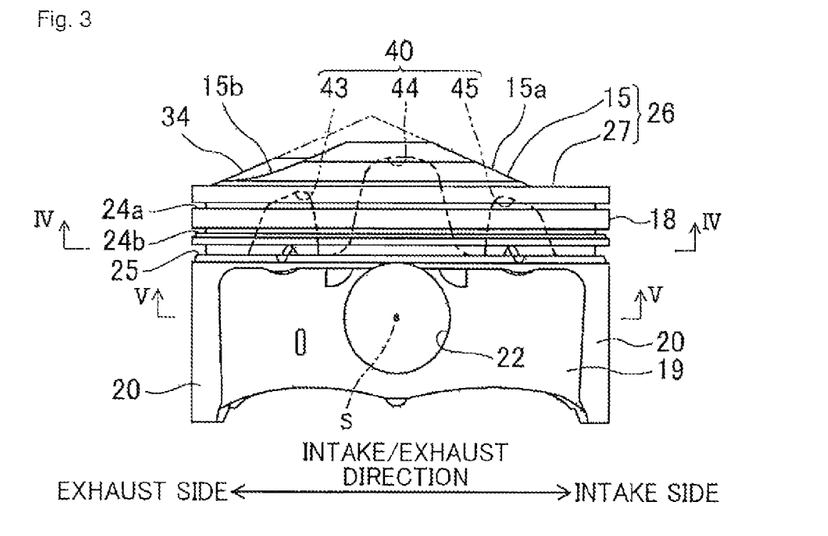
FIG. 3 is an arrow view along a direction III shown in FIG. 2.
Figure 4:
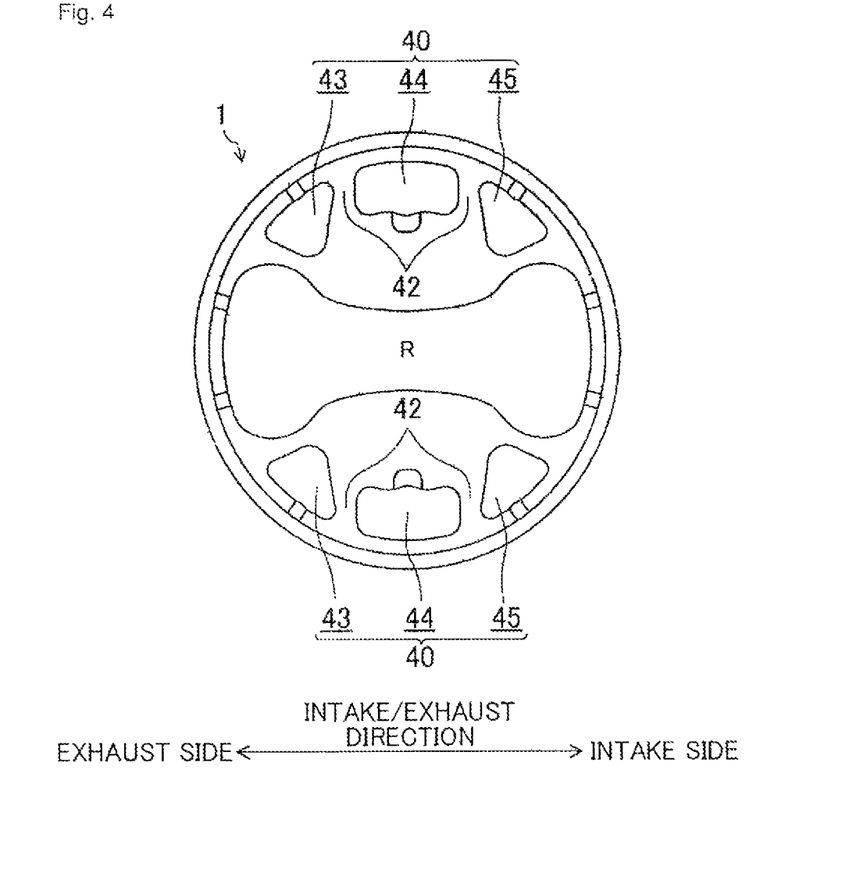
FIG. 4 is a cross-sectional diagram taken along a line IV-IV shown in FIG. 3.
Figure 5:
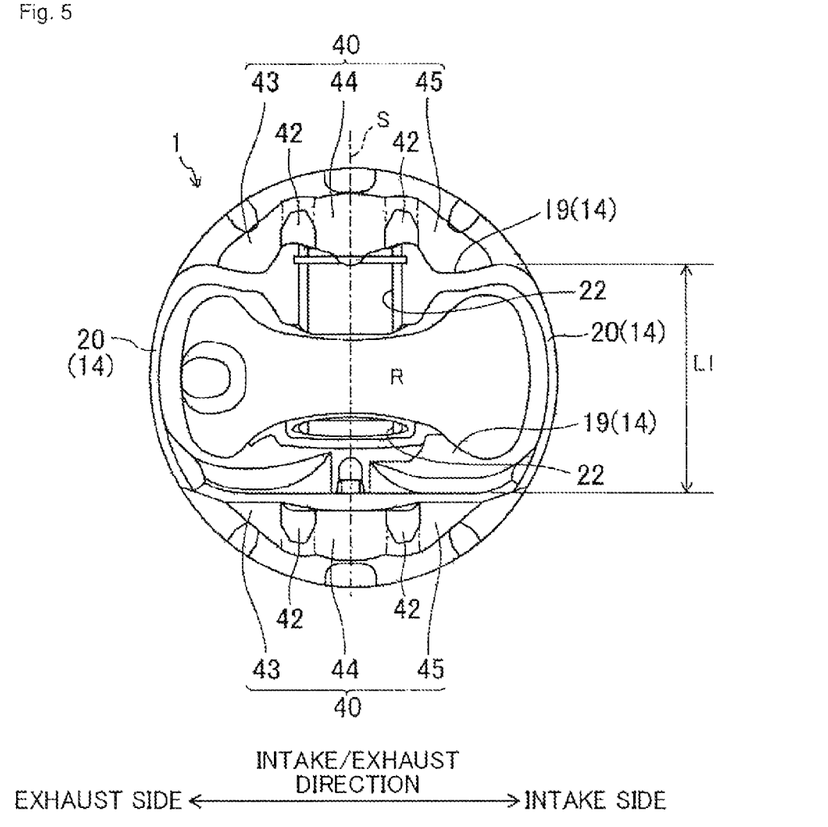
FIG. 5 is a cross-sectional diagram taken along a line V-V shown in FIG. 3.
Figure 6:
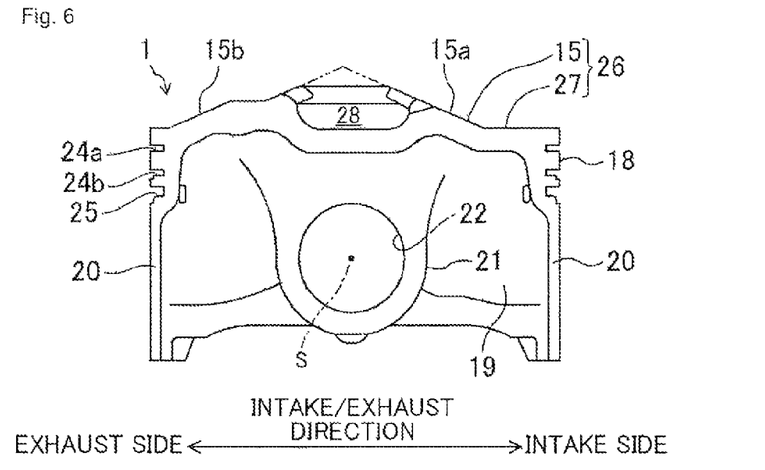
FIG. 6 is a cross-sectional diagram taken along a line VI-VI shown in FIG. 2.

The bulging part 15 is formed in conformity with the triangle roof shape of the ceiling part 7a and bulges from the intake side and the exhaust side toward the center of the ceiling part 7a (see FIGS. 3 and 6). In other words, the bulging part 15 is formed to have a mountain-shaped cross section (pent roof) extending in a direction of the shaft center of the pin boss part 21, and is disposed on the shaft center of the pin boss part 21 in the planar view. In conformity with the roof shape of the ceiling part 7a, the position where extended surfaces of two inclined surfaces 15a, 15b of the bulging part 15 intersect with each other is located on the exhaust side with respect to the center of the cylinder.

Specifically, the overall height of the bulging part 15 is greater on the exhaust side than the intake side. A bowl-shaped concave part 28 is formed in the vicinity of the center of the bulging part 15. Providing this concave part 28 facilitates the formation of a flame kernel by the ignition of the spark plug 13. Substantially circular clearance grooves 33 are formed on the inclined surface 15a on the intake side so as to avoid interference between the bulging part 15 and the intake valve 10. Also, stepped projecting parts 34 are formed at an angle on the inclined surface 15b on the exhaust side so as to avoid interference between the bulging part 15 and the exhaust valve 11 (see FIG. 2).

A concave thinned part 40 that is opened on the lower surface of the land part 18 is formed in the land part 18 (see FIGS. 3 to 5 and FIG. 7). The opened part of the thinned part 40 is formed in a region outside the predetermined region R (outside the frame part 14 in the radial direction) held between the sidewall parts 19 on the abovementioned lower surface. The deepest part of the thinned part 40, which is an upper end part, is located within the bulging part 15 above the base surface 27, as shown in FIG. 3.

More specifically, two ribs 42 (see FIG. 5) that couple the land part 18 to the sidewall parts 19 are formed in the thinned part 40. These two ribs 42 are disposed side by side in the intake/exhaust direction, with the shaft center of the pin boss 21 therebetween. Furthermore, the thinned part 40 is divided into three concave spaces 43 to 45 by these two ribs 42.

In a planar cross-sectional view, the pin boss shaft center S is in a positional relationship where it intersects with a central concave space 44 held between the two ribs 42, and the deepest part of the central concave space 44, 44 is located within the bulging part 15 above the base surface 27. Of these three concave spaces 43 to 45, the central concave space 44 is the deepest (the depth in a direction of a land part shaft center).

When comparing the concave space 43 on the exhaust side with the concave space 45 on the intake side, the concave space 43 on the exhaust side is deeper than the concave space 45 on the intake side (see FIG. 3). The concave space 43 on the exhaust side and the concave space 45 on the intake side are located such that the deepest parts thereof are located below the base surface 27 and above the top ring groove 24a.

Figure 7:
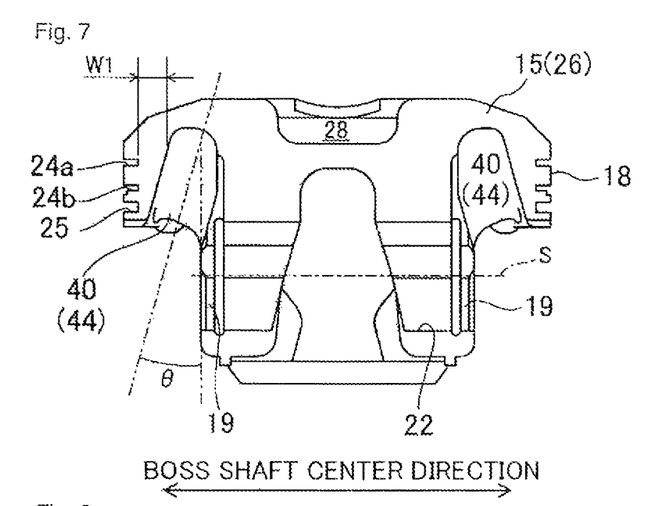
FIG. 7 is a cross-sectional diagram taken along a line VII-VII shown in FIG. 2.

Moreover, as shown in FIG. 7, each of the concave spaces 43 to 45 is inclined such that the upper side thereof is inclined inward in the radial direction (only the central concave spaces 44 are shown in FIG. 7). This inclined angle "theta" is preferably 45 degrees or less, and is set to fall within a range of 10 degrees to 30 degrees in the present embodiment.

As described in Embodiment 1 above, the crown part 26 is configured by the flat base surface 27 and the bulging part 15 bulging upward above the base surface 27. The thinned part 40 is formed deep such that the deepest part thereof reaches the inside of the bulging part 15 above the base surface 27 of the crown part 26. Therefore, a space around a section in the land part 18 where the top ring groove 24a is provided can be expanded, as shown in FIG. 7.

Accordingly, the deepest part of each concave space 44 (the thinned part 40) can be interposed in the middle of a heat transfer system path, which extends to the top ring groove 24a from the bulging part 15 of the crown part 26 that is exposed directly to combustion heat, so that the combustion heat is not transmitted easily to the top ring groove 24a. In addition, the combustion heat can be absorbed by mist oil within the crank chamber via the deepest part of the concave space 44. As a result, a heat load around the top ring groove 24a can be reduced.

When some of the oil injected from the oil jet device 6 enters the thinned part 40 in the form of the mist oil, a peripheral section of the top ring groove 24a can be cooled actively by this entering mist oil. In other words, the thinned part 40 can be utilizes as a cooling space.

Consequently, the top ring groove 24a can be brought as close as possible to the base surface to reduce the size of a concave part 50 that generates HC (hydrocarbon), without exposing the top ring 30 to a thermally severe condition (the concave space 50 is formed by the outer circumferential surface of the land part 18, the inner circumferential surface of the cylinder 4, and the top ring 30. See FIG. 1). In this manner, thermal protection of the top ring 30 and the inhibition the generation of HC can be achieved.

In Embodiment 1 described above, the concave space 44, which is the thinned part 40, is inclined such that the upper side thereof is inclined inward in the radial direction, and also is formed to be wide inside and outside in the radial direction (instead of tapering the concave space 44, a spatial distance in the radial direction thereof is made substantially constant). Consequently, thickness W1 in the radial direction around the top ring groove 24a can be made thin, and the cooling properties around the top ring groove 24a of the land part 18 can be improved.

Here, although the thinned part 40 is inclined such that the upper side thereof is inclined inward in the radial direction as described above, this inclined angle "theta" is set at a relatively small value between 10 degrees to 30 degrees, so that the thickness W1 in the radial direction of the section in the land part 18 where the top ring groove 24a is provided can be made thinner, compared to when the inclined angle is set at, for example, 45 degrees or above. In this manner, the heat dissipation around the top ring groove 24a can be further enhanced, improving the cooling properties thereof.

In Embodiment 1 described above, deterioration of the rigidity of the land part 18 that is caused by the thinned part 40 can be prevented by providing the thinned part 40 with the two rings 42. Of the three concave spaces 43 to 45 divided by these ribs 42, the deepest part of the concave space 45 on the intake side and the deepest part of the concave space 43 on the exhaust side are located above the top ring groove 24a. In this manner, the cooling effect around the top ring groove 24a can be improved rapidly.

In addition, in Embodiment 1 described above, the concave space 43 on the exhaust side is formed deeper than the concave space 45 on the intake side. This can prevent disruption of the weight balance of the piston 1 in the intake/exhaust direction, which can be caused by making the exhaust side section of the bulging part 15 higher than the intake side section of the same. In addition, this configuration can improve the cooling effect of the exhaust side section of the land part 18 that is exposed to a higher temperature than the intake side.

In Embodiment 1 described above, the oil jet device 6 injects the oil toward the exhaust side end part within the predetermined region R on the lower surface of the land part 18. The oil injected from the oil jet device 6 (the injection nozzle 16) is sprayed to the exhaust side end part and then guided by the pair of sidewall parts 19 to flow from the exhaust side toward the intake side. In this manner, the cooling properties in the intake/exhaust direction of the land part 18 that can be subjected to high temperatures at the time of the combustion can be secured adequately.

When securing the cooling properties in the intake/exhaust direction of the land part 18 by means of the oil jet device 6, the cooling properties in the direction perpendicular to the intake/exhaust direction (i.e., the direction of the shaft center S of the pin boss part 21) become relatively low.

On the other hand, in Embodiment 1 described above, the deepest concave space 44 out of the three concave spaces 43 to 45 configuring the thinned part 40 is formed on the shaft center S of the pin boss part 21 in the planar view, thereby securing the cooling properties in the direction of the shaft center S.

Moreover, in Embodiment 1, the bulging part 15 is formed to have a mountain-shaped cross section extending in the direction of the shaft center S of the pin boss part 21, and is disposed on the shaft center in the planar view. Accordingly, the bulging part 15 can be formed in a position corresponding to the thinned part 40 (the deepest concave space 44) in the planar view. As a result, the thinned part 40 can be formed such that the deepest part thereof adequately reaches deep inside the bulging part 15.

As described above, Embodiment 1 can thermally protect the top ring 30 and at the same time bring the top ring 30 as close as possible to the base surface 27 to inhibit the generation of HC, by rapidly improving the cooling effect of the land part 18 at the time of the combustion and, particularly, the cooling effect around the top ring groove 24a.

Embodiment 2

Figure 9:
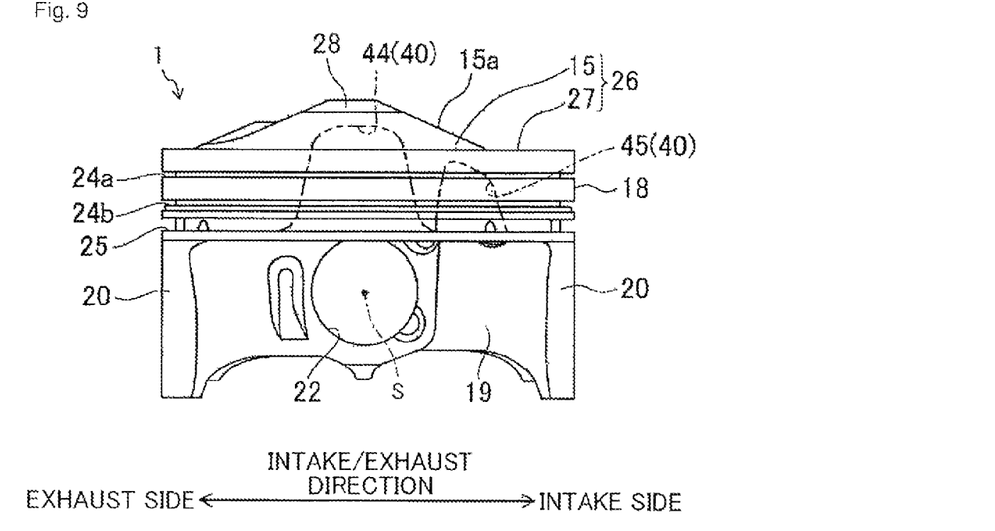
FIG. 9 is a diagram corresponding to FIG. 3, showing Embodiment 2.
Figure 10:
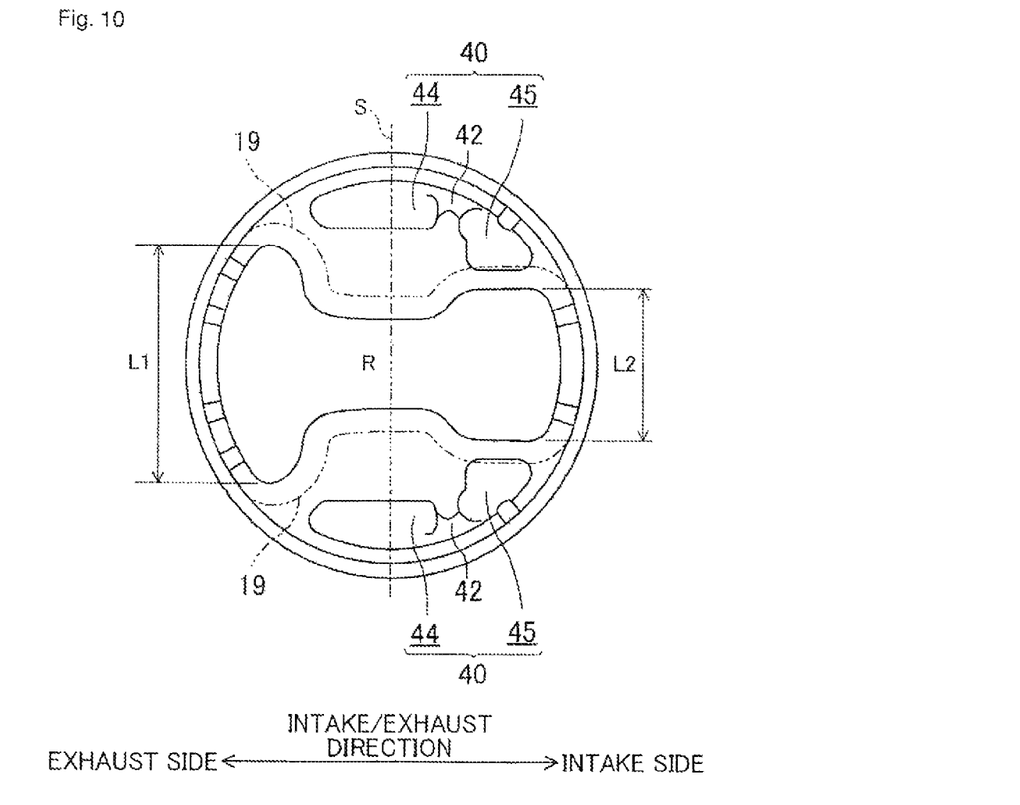
FIG. 10 is a diagram corresponding to FIG. 4, showing Embodiment 2.

FIGS. 9 and 10 show Embodiment 2 of the present invention, wherein the configuration of the thinned part 40 is different than that described in Embodiment 1. Note that the same reference numerals are used to illustrate the components that are substantially same as those shown in FIGS. 3 and 4, and, therefore, the detailed descriptions thereof are omitted.

Specifically, in the present embodiment the thinned part 40 is configured without the concave space 43 on the exhaust side out of the three concave spaces 43 to 45 described in Embodiment 1. More specifically, the thinned part 40 is provided with only one rib 42 that couples the land part 18 to the sidewall parts 19. In the planar view, the thinned part 40 is configured by two components: the concave space 44 located on the pin boss shaft center and the concave space 45 located on the intake side from the concave space 44.

In the present embodiment, the skirt parts 20 on the exhaust side (see FIG. 10) can be made wide by eliminating the concave space 43 on the exhaust side that is described in Embodiment 1. The width of the skirt part 20 that is located on the thrust side in the expansion stroke (the skirt part 20 on the exhaust side) can be set greater than the width of the skirt part 20 on the anti-thrust side (the skirt part 20 on the intake side).

Thus, a surface pressure acting on the skirt part 20 on the thrust side in the expansion stroke can be reduced, and the thrust rigidity of this skirt part can be lowered. In addition, because the width L1 of the exhaust side end part of the predetermined region R where the oil is injected is securely made wider than width L2 of an intake side end part, the cooling effect of the oil injection in the exhaust side end part of the land part 18 can be further improved.

On the other hand, the thinned part 40 (the concave spaces 44, 45) is formed over the area between the part near the center in the intake/exhaust direction of the land part 18 and the part on the intake side. Therefore, the cooling properties of the part in the land part 18 on the intake side can be secured. In this manner, the present embodiment can thermally protect the top ring 30 and inhibit the generation of HC while improving the strength of the skirt parts 20.

Other Embodiments

The configuration of the present invention is not limited to the embodiments described above and comprises various other configurations. In other words, although the thinned part 40 described in each of the embodiments is divided into the plurality of concave spaces 43 to 45 by the ribs 42, the ribs 42 are not necessarily required.

In each Embodiment, the deepest part of the concave space 45 on the intake side and the deepest part of the concave space 43 on the exhaust side are located below the base surface 27, but, of course, can be located above the base surface 27.

Figure 8:
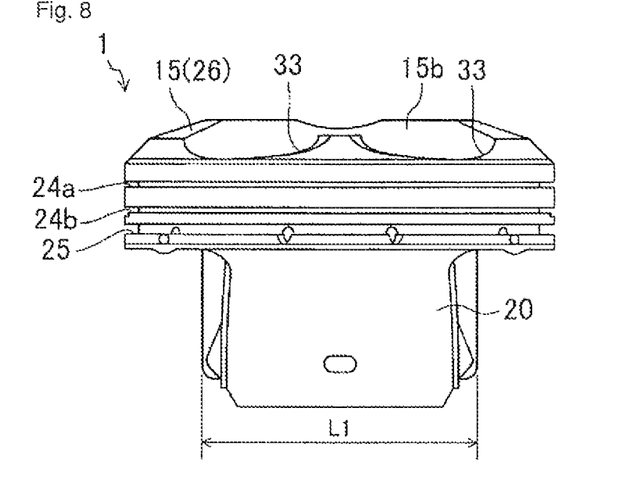
FIG. 8 is an arrow view along a direction VIII shown in FIG. 2.

In the embodiments described above, the central concave space 44 (the concave space 44 located on the shaft center of the pin boss part 21 in the planar view) has a flat bottom surface 44a (see FIGS. 3 and 8). However, an exhaust side section of the bottom surface 44a may be relatively deeper (higher) than an intake side section of the same in order to, for example, prevent the disruption of the weight balance of the piston 1 in the intake/exhaust direction.

In sum, as described above, the invention of the present application relates to a piston for a spark-ignition engine, the piston having:
a land part (18), an upper surface of which has a crown part (26) forming a combustion chamber;
a pair of skirt parts (20) extending downward from a peripheral part of the land part (18) and facing each other in a radial direction thereof;
a pair of sidewall parts (19) coupling side end parts of the pair of skirt parts (20) to each other;
a pin boss part (21) that is formed in each of the sidewall parts, and
a thinned part (40) formed in the land part,
wherein the crown part (26) has a flat base surface (27) and a bulging part (15) bulging upward above the base surface,
the thinned part (40) is formed into a concave shape that is opened in a region outside a predetermined region (R) held between the sidewall parts (19) in a lower surface of the land part (18), and
an upper end part of the thinned part (40) is located within the bulging part (15) above the base surface (27) of the crown part (26).

According to this configuration, the geometric compression ratio of the engine can be set high by forming the bulging part in the crown part that forms the combustion chamber.

By the way, the outer circumferential surface of the land part normally has a plurality of steps of ring grooves, and a seal ring or oil ring is fitted into each of the ring grooves. Therefore, an annular concave part that conforms with the outer circumferential surface of the land part is formed between the top ring fitted into the top ring groove, the inner circumferential surface of the cylinder, and the outer circumferential surface of the land part. This concave part leaves unburnt gas therein and thus is the cause of HC production. Therefore, it is preferred that the size of the concave space be as small as possible.

In so doing, the top ring needs to be brought as close as possible to the base surface. However, in an engine with a high compression ratio, the temperature within the combustion chamber becomes relatively high at the time of combustion, which exposes the top ring to a thermally severe condition by bringing the top ring closer to the base surface.

In the present invention, on the other hand, the thinned part is formed in the land part. With the use of the bulging part provided in the crown part, the thinned part is formed such that its upper end position is brought deep inside the bulging part above the base surface of the crown part.

As a result, the space around the section where the top ring groove of the land part is formed can be further expanded, whereby the cooling properties of the mist oil entering from the inner surface of the thinned part can be improved under a condition where the atmosphere within the crankcase is filled with the mist oil. Accordingly, the heat dissipation around the top ring groove can be improved, while bringing the top ring groove as close as possible to the base surface. Eventually, the thermal protection of the top ring and the inhibition of the generation of HC can be achieved.

In the invention of the present application, the engine is preferably provided with an oil jet device that injects oil toward the predetermined region.

According to this configuration, the predetermined region that is held between the sidewall parts of the lower surface of the land part can be actively cooled by the oil injected from the oil jet device. This predetermined region is preferably a region along the intake/exhaust direction that is subjected to particularly high temperatures at the time of combustion.

In the present invention, even when the oil is injected toward the predetermined area by the oil jet device, some of the injected oil becomes mist so as to be able to enter the thinned part more easily. Therefore, the peripheral section of the top ring groove can be cooled actively by the entering oil, further improving the effects of the invention described above.

In the planar view, the predetermined region extends along the intake/exhaust direction of the combustion chamber. The pin boss part, in the planar view, is formed such that the shaft center S thereof runs in a direction perpendicular to the intake/exhaust direction of the combustion chamber and passes through the shaft center of the land part. The opening section of the thinned part is partially disposed in a position that intersects with the shaft center S of the pin boss part, in the planar view.

This configuration can improve the cooling properties in the direction (the direction of the shaft center S of the pin boss part) perpendicular to the intake/exhaust direction of the land part, where the cooling effect of the oil jet device is low. Therefore, cooling of the land part can be further promoted so that the effects similar to those of the invention described above can be securely obtained. Note that the term "planar view" used in the present specification means "as viewed from the direction of the shaft center of the piston (the direction of the shaft center of the land part)."

Furthermore, the bulging part is preferably formed to have a mountain-shaped cross section extending in the direction of the shaft center S of the pin boss part, and is preferably disposed on the shaft center of the pin boss part in the planar view.

According to this configuration, the bulging part is formed on the shaft center S of the pin boss part in the planar view. Therefore, the bulging part can be securely provided with a sufficient height so as to prevent interference between the bulging part and the intake and exhaust valves, so that the geometric compression ratio can be effectively increased. At the same time, the thinned part that has an opening on the shaft center S of the pin boss part can be formed such that the deepest part thereof adequately reaches deep inside the bulging part.

Moreover, the thinned part is preferably inclined such that the upper side thereof is inclined inward in the radial direction, and the angle of inclination is preferably set to fall within a range of 10 degrees to 30 degrees. As a result, the thickness W1 (see FIG. 7) in the radial direction of the section in the land part 18 where the top ring groove 24a is provided can be made thinner, compared to when the inclined angle is set at, for example, 45 degrees or above. In this manner, the heat dissipation around the top ring groove 24a can be further enhanced, improving the cooling properties thereof.

INDUSTRIAL APPLICABILITY

The present invention is useful as a piston for a spark-ignition engine, and particularly useful when applied to an engine that adopts a piston in which a bulging part is provided in a crown part.

The invention claimed is:

1. A piston for a spark-ignition engine, comprising:
a land part, an upper surface of which has a crown part forming a combustion chamber;
a pair of skirt parts extending downward from a peripheral part of the land part and facing each other in a radial direction thereof;
a pair of sidewall parts coupling side end parts of the pair of skirt parts to each other;
a pin boss part that is formed in each of the sidewall parts; and
a thinned part formed in the land part,
wherein the crown part has a flat base surface and a bulging part bulging upward above the base surface,
the thinned part is formed into a concave shape that is opened in a region outside a predetermined region held between the sidewall parts in a lower surface of the land part,
an upper end part of the thinned part is located within the bulging part above the base surface of the crown part,
in a planar view the predetermined region is a region that extends in an intake/exhaust direction of the combustion chamber,
the pin boss part, in the planar view, is formed such that a shaft center thereof runs in a direction perpendicular to the intake/exhaust direction of the combustion chamber and passes through a shaft center of the land part,
an opening section of the thinned part is partially disposed in a position that intersects with the shaft center of the pin boss part, in the planar view, and
the bulging part is formed to have a mountain-shaped cross section extending in a direction of the shaft center of the pin boss part, and is disposed on the shaft center of the pin boss part in the planar view.

2. A piston for a spark-ignition engine comprising:
a land part, an upper surface of which has a crown part forming a combustion chamber;
a pair of skirt parts extending downward from a peripheral part of the land part and facing each other in a radial direction thereof;
a pair of sidewall parts coupling side end parts of the pair of skirt parts to each other;
a pin boss part that is formed in each of the sidewall parts; and
a thinned part formed in the land part,
wherein the crown part has a flat base surface and a bulging part bulging upward above the base surface,
the thinned part is formed into a concave shape that is opened in a region outside a predetermined region held between the sidewall parts in a lower surface of the land part,
an upper end part of the thinned part is located within the bulging part above the base surface of the crown part,
in a planar view the predetermined region is a region that extends in an intake/exhaust direction of the combustion chamber,
the engine is provided with an oil jet device that injects oil toward the predetermined region,
the pin boss part, in the planar view, is formed such that a shaft center thereof runs in a direction perpendicular to the intake/exhaust direction of the combustion chamber and passes through a shaft center of the land part,
an opening section of the thinned part is partially disposed in a position that intersects with the shaft center of the pin boss part, in the planar view, and
the bulging part is formed to have a mountain-shaped cross section extending in a direction of the shaft center of the pin boss part, and is disposed on the shaft center of the pin boss part in the planar view.

3. The piston for a spark-ignition engine according to claim 1, wherein the thinned part is inclined such that an upper side thereof is inclined inward in the radial direction, and an angle of the inclination is set to fall within a range of 10 degrees to 30 degrees.

4. The piston for a spark-ignition engine according to claim 2, wherein the thinned part is inclined such that an upper side thereof is inclined inward in the radial direction, and an angle of the inclination is set to fall within a range of 10 degrees to 30 degrees.

\* \* \* \* \*